United States Patent

[11] 3,568,818

[72] Inventor Douglas R. Hanson
1720 9th Ave., Anoka, Minn. 55303

[21] Appl. No. 851,250
[22] Filed Aug. 19, 1969
[45] Patented Mar. 9, 1971

[54] CONVEYOR FOR ACCUMULATING, SPACING AND STORING ARTICLES
3 Claims, 7 Drawing Figs.

[52] U.S. Cl. .......... 198/34, 198/218
[51] Int. Cl. .......... B65g 25/04, B65g 47/26
[50] Field of Search .......... 198/19, 34, 129, 218; 221/13 (Inquired)

[56] References Cited
UNITED STATES PATENTS
3,369,650 2/1968 Caretto .......... 198/34

*Primary Examiner*—Edward A. Sroka
*Attorney*—Burd, Braddock & Bartz

ABSTRACT: An accumulation conveyor track, including parallel lines of pairs of spaced-apart rollers, receives pallets or boxes to be stored thereon and positions and maintains them in predetermined spaced relation to each other. The boxes never get closer than the predetermined distance to each other. An elevatable and lowerable platform rides on a platform carriage. This carriage is chain driven in the direction of box movement and rides on a carriage track below and parallel to a conveyor track support plane defined by the top of the spaced-apart conveyor rollers. Such a platform raises into driving relationship to each box as it comes on to the conveyor and moves the box up to the predetermined distance from the box ahead of it. A feeler arm on the platform carriage ahead of the platform allows a sprocket on a pivoted platform drive arm to engage and run on a fixed roller chain pathway below the platform carriage track to position the platform in its upper position when no obstruction is felt by the feeler arm. When the feeler arm encounters a box ahead of it, it causes the platform to lower to position its box on a conveyor track at the predetermined distance from the forward box. The power to raise the platform and at least part of the weight of the box is derived from the reaction of the motion of the platform carriage with respect to the fixed chain pathway.

INVENTOR.
DOUGLAS R. HANSON
BY
Burd Braddock & Bartz
ATTORNEYS

INVENTOR.
DOUGLAS R. HANSON
BY
Burd Braddock & Bartz
ATTORNEYS

FIG. 5
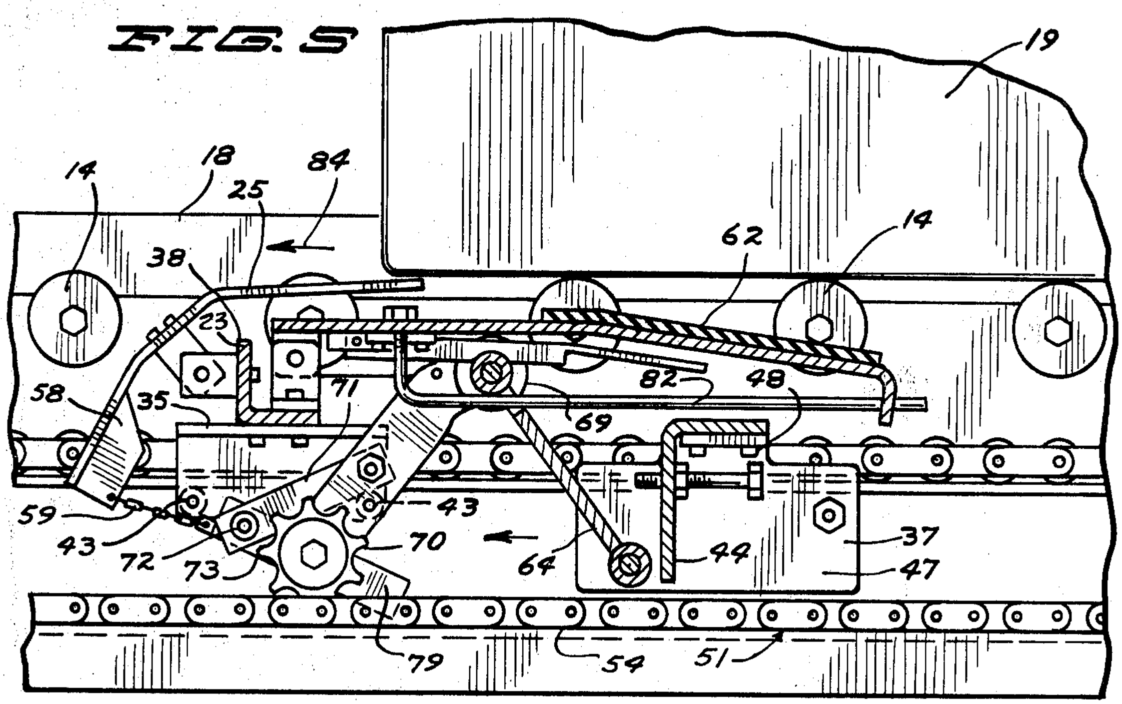
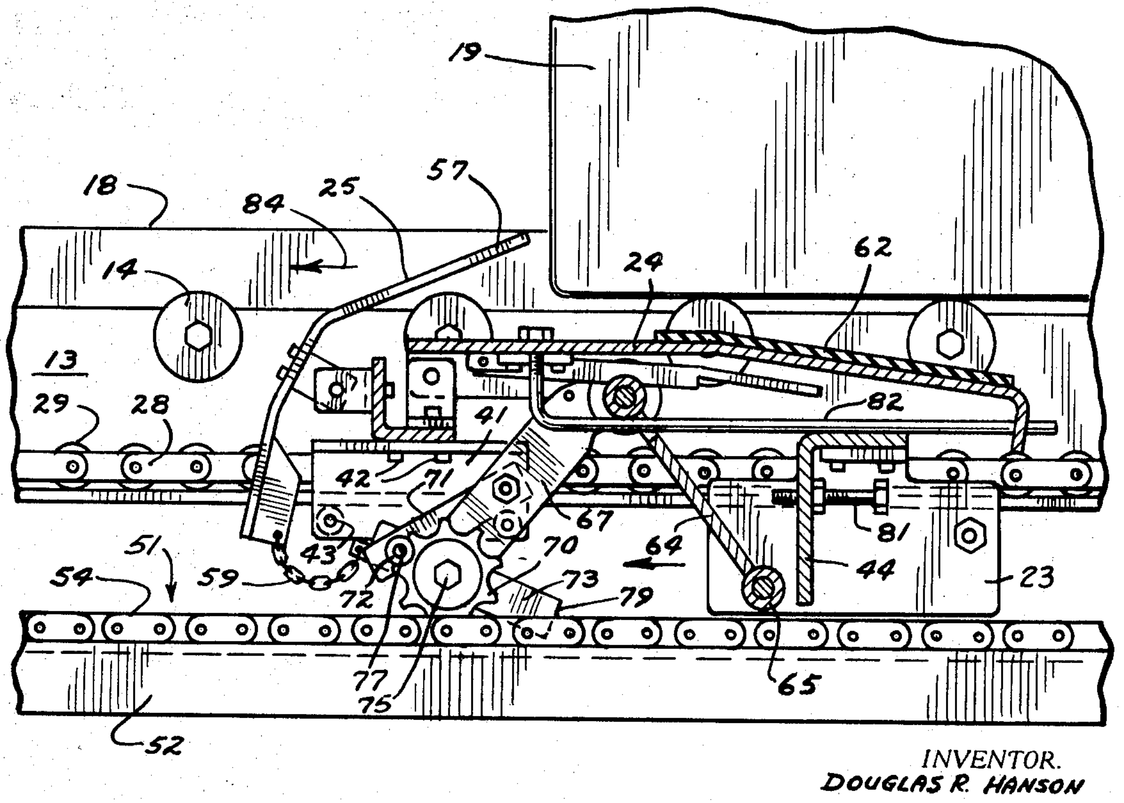
FIG. 6
INVENTOR.
DOUGLAS R. HANSON
BY
Burd Braddock & Bartz
ATTORNEYS INVENTOR.
DOUGLAS R. HANSON
BY
Burd Braddock & Bartz
ATTORNEYS

CONVEYOR FOR ACCUMULATING, SPACING AND STORING ARTICLES

BACKGROUND OF INVENTION

In many warehousing and production operations, pallets or boxes of materials are transmitted by linear conveyor belts or paths. In these systems, it is often advantageous to accumulate these boxes on conveyor spurs and to hold them until they are needed elsewhere. This invention presents apparatus for accomplishing this purpose in such a manner that all of the boxes or other objects on a particular accumulation spur are stored in adjacent spaced relationship to the far end of the spur and in such a manner that the boxes never come in contact with each other while moving to such storage position.

In similar conveyors in the prior art, pairs of parallel roller tracks were used as the conveyor means, and heavily spring-loaded pushers were moved between the parallel lines of rollers to push on the last box to be put on the conveyor to cause it and any boxes ahead of it to be pushed to the outermost end of the conveyor. When a box was removed from the far end of the conveyor as it was needed, every box stored on the conveyor was moved forward through the instrumentality of the spring-loaded pusher acting on the latest box to have been placed on the conveyor. Thus the power needed to move every box in the line simultaneously was considerable, and so the spring loading on the pusher arm was considerable. When the boxes all moved forward so that the now farther most box reached the end stop of the conveyor, the continued force on the pusher bar in direction toward the outer end of the conveyor would cause the bar to collapse and to slide underneath each of the boxes in turn scraping and bumping over the bottom thereof thus tending to damage both the pusher arm and the boxes or pallets.

This system has the further disadvantage that the excessive forces needed to move all of the boxes simultaneously as one box was moved away from the end of the conveyor were necessarily more than enough to move a particular box to position and in contact with the next forward box on the conveyor. Thus, this last box, upon coming on to the conveyor and being pushed ahead by the pusher arm, was carried against the next to the last box with considerable force tending to cause damage to the boxes and their contents. In cases where the objects on the conveyor are not all of the same strength, actually crushing the materials thus stored sometimes took place.

Furthermore, each movement of the boxes on the conveyor caused a severe shock on each of the boxes and, consequently, on its contents all to the detriment of the contents.

SUMMARY OF THE INVENTION

It is an object of the present invention to provide an accumulation and storage conveyor in which each box or other storage unit being deposited on the conveyor will be moved forward separately through the instrumentality of a raised platform which will either lift the box from the conveyor track completely or will lift a sufficient portion of the weight of the box so that it can be dragged or moved along the conveyor track until such time as it reaches a position which is a predetermined distance behind the next box on the conveyor.

A further object of the invention is to provide a conveyor structure wherein each of the boxes on the conveyor will be moved toward the outer end of the conveyor separately to the end that each of the boxes is positioned from adjacent boxes or the outer end of the conveyor by the predetermined distance.

A still further object of the invention is to provide a structure wherein the power to elevate the platform and carry at least part of the weight of a conveyed box is obtained from the external mechanism driving the platform and carriage which moves each of the boxes toward the end of the conveyor.

Another object is to provide a conveyor which will handle indiscriminately pallets or boxes of various weights and lengths.

A further object is to provide apparatus which can be used as a regular on line conveyor where it is desirable or necessary that the articles conveyed never come in contact with each other.

A major object of the invention is to provide for adjusting the "predetermined" distance between the articles on the conveyor.

To accomplish the foregoing, an accumulation conveyor of the present invention includes a linear conveyor track having means to support boxes to be conveyed for lineal movement therealong and to confine the boxes against substantial lateral movement. One or more platform carriages are supported on a carriage track to move parallel to and beneath the conveyor track, and a platform is associated with each of said carriages and is operable from a lowered position in clearing relationship to any boxes supported on the conveyor track to an elevated relationship where it will come in contacting, driving relationship to a particular box on the conveyor. A feeler arm is pivotally mounted with respect to each platform carriage and is operative to activate a platform control linkage to maintain the platform in its lowered condition, for example, when the feeler arm is held downwardly as it passes underneath a particular box; and operative on said control arm when the feeler arm passes into clearing relationship to such box to cause the control arm to come in contact with a fixed pathway parallel to and below the carriage track to cause the platform to be elevated to come into driving relationship to the box which the feeler arm has just cleared. This box will now move ahead with the platform, platform carriage and feeler arm until such time as the feeler arm comes into contact with the rear edge of the box ahead of the conveyed box on the conveyor. At this point, the feeler arm will be depressed as it moves underneath the forward box, and this will cause the platform control linkage to move into clearing relationship with the fixed pathway, thus allowing the platform to move into clearing, nondriving relationship to the conveyed box so that the box will come to a halt on the conveyor in predetermined, spaced relationship to the box ahead of it.

As the feeler arm, carriage and platform move underneath and past this next to the last box, the feeler arm will again pop up, but will immediately come into contact with the trailing edge of the next box ahead of it, and so the linkage will not operate to raise the platform. This operation will continue as the feeler arm passes under each of the boxes until it comes to a space where, for example, the last box on the conveyor has been removed. At this point, when the feeler arm pops up, the platform will also rise up into driving relationship with this now end box and will carry it ahead until the feeler arm is contacted by a bar across the end of the conveyor, at which point the box will be deposited in the predetermined spaced relationship to this end bar. The next time one of these carriage assemblies arrives at the space vacated by the box just moved, the next box in line will be carried down into spaced relationship with that now last box. This action will continue until all of the available space at the far end of the conveyor has been filled.

BRIEF DESCRIPTION OF THE DRAWINGS

In the drawings,

FIG. 5 is an enlarged vertical sectional view taken on the line 5—5 in FIG. 3 and showing the relationship of the platform carriage, the platform and the feeler arm with respect to a box to be stored just as this assembly moves to bring the feeler arm into clearing relationship to a box on the conveyor;

FIG. 6 is an enlarged vertical sectional view similar to FIG. 5 but showing the relationship of the parts just as the feeler arm moves into clearing relationship with a box on the conveyor;

DESCRIPTION OF THE PREFERRED EMBODIMENT

Figure 3:
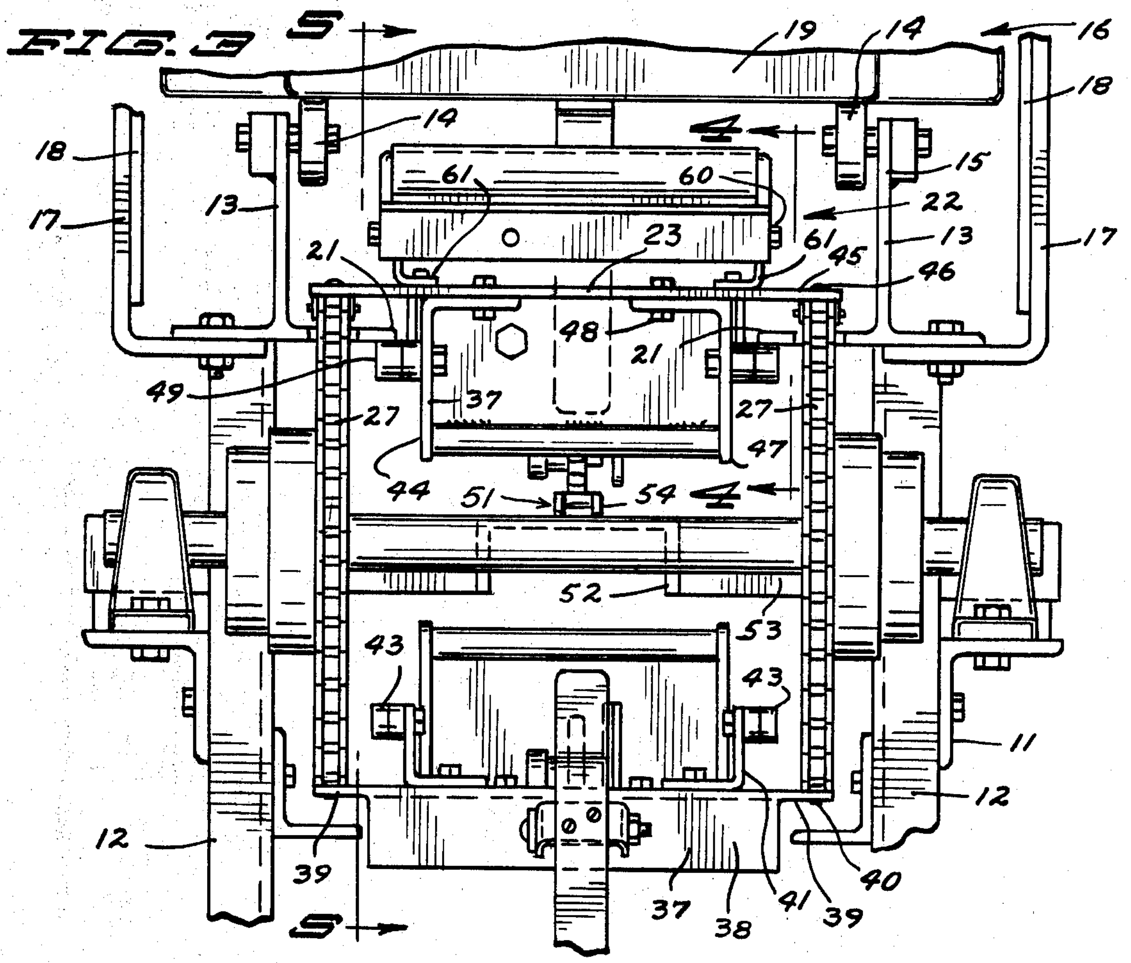
FIG. 3 is an enlarged fragmentary end elevational view of the conveyor of FIGS. 1 and 2 as seen from the right in FIG. 2.

An accumulation conveyor 10 includes a main frame 11 having legs 12 which support T-irons 13 on which parallel lines of pairs of spaced apart rollers 14 are supported as at 15 as best seen in FIG. 3. Angle iron clips 17 extend outwardly and upwardly from T-irons 13 to form supports for confining sidewalls 18 of a linear conveyor track indicated generally at 16. Rollers 14 also constitute a portion of this linear conveyor track, and the upper surfaces of these rollers define a conveyor track support plane for supporting boxes 19 or other objects to be accumulated and stored in spaced relationship to each other and to the outer end of 20 of the conveyor 10.

Figure 2:
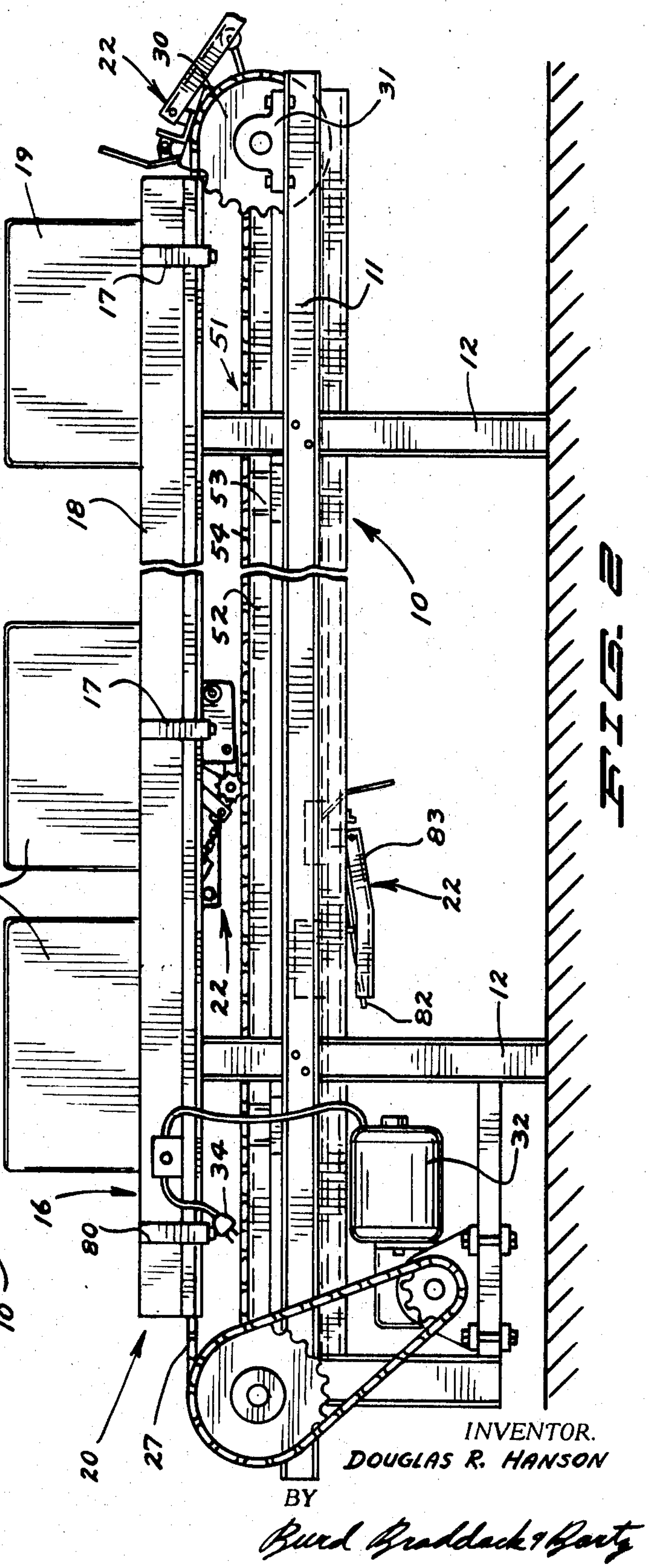
FIG. 2 is a side elevational view of the conveyor and boxes of FIG. 1.

A carriage track is constituted as the inwardly extending coplanar horizontal facing spaced-apart webs 21 of each of the T-irons 13. This carriage track supports a plurality of carriage assemblies 22 each of which includes a platform carriage 23, a platform 24 pivotally mounted to the carriage, and a feeler arm 25 also pivotally mounted to the carriage. A pair of endless flexible carriage assembly drive chains 27, 27 each include chain bars 28 of any usual or preferred material and rollers 29 of some such suitable material as acetal resin sold by Dupont under the trademark DELRIN. See FIG. 4. These rollers run on the upper surfaces of the carriage tracks 21. These chains are carried on sprockets 30 journaled in bearings 31 and a drive shaft 32 for the sprockets at the outer end 20 of the conveyor is driven through a chain and sprocket linkage and a gear box from a motor 33 as best seen in FIG. 2. This motor drive is continuous during the operation of the conveyor, so long as the motor power inlet 34 is connected to a power source (not shown).

The plurality of platform carriages 23 are each made up of a leading dolly or truck 35 and a following dolly or truck 37. This leading dolly 35 includes an angle iron 38 which has opposite ends 39, 39 thereof each fastened to a flight of one of the drive chains 27 as at 40. This can best be seen in FIG. 3 where a leading truck or dolly 35 is situated upside down on its return trip on the underside of the conveyor. Two additional angle irons 41, 41 are fastened transversely to the angle iron 38 as at 42, and these each carry a pair of roller bearing wheels 43 which are designed to run on the underside of the carriage track 21.

The following dolly or truck 37 includes an angle iron 44 which has opposite end portions 45, 45 each attached to a flight of one of the chains 27 as at 46. Spaced-apart downwardly extending L-shaped plates 47, 47 are each attached to an angle iron 44 as at 48, and each has a roller bearing wheel 49 extending outwardly therefrom, also to ride on the underside of carriage track 21 as best seen in FIG. 3. Because the leading dolly 35 is fastened to and supported by one flight of the roller chain on each end thereof, and because the following dolly 37 is fastened to and supported by a following flight of the roller chain on either side thereof, the lineal distance between the dollys is fixed and thus the two act together as a part of the carriage 23, but still have flexibility to move around with the chain as it passes over the sprockets at the ends of the conveyor.

A fixed power reaction pathway 51 includes an inverted channel iron 52 situated substantially in parallel alignment with the longitudinal center line of the conveyor 10, below the carriage track 21 and above the return path for the carriage assembly drive chains 27. This channel iron is supported with respect to the main frame 11 by channel irons 53, as perhaps best seen in FIGS. 2 and 3. Also a part of this fixed pathway is a section of roller chain 54 fixedly fastened to the upper surface of the channel iron 52 in any usual or preferred manner.

Figure 7:
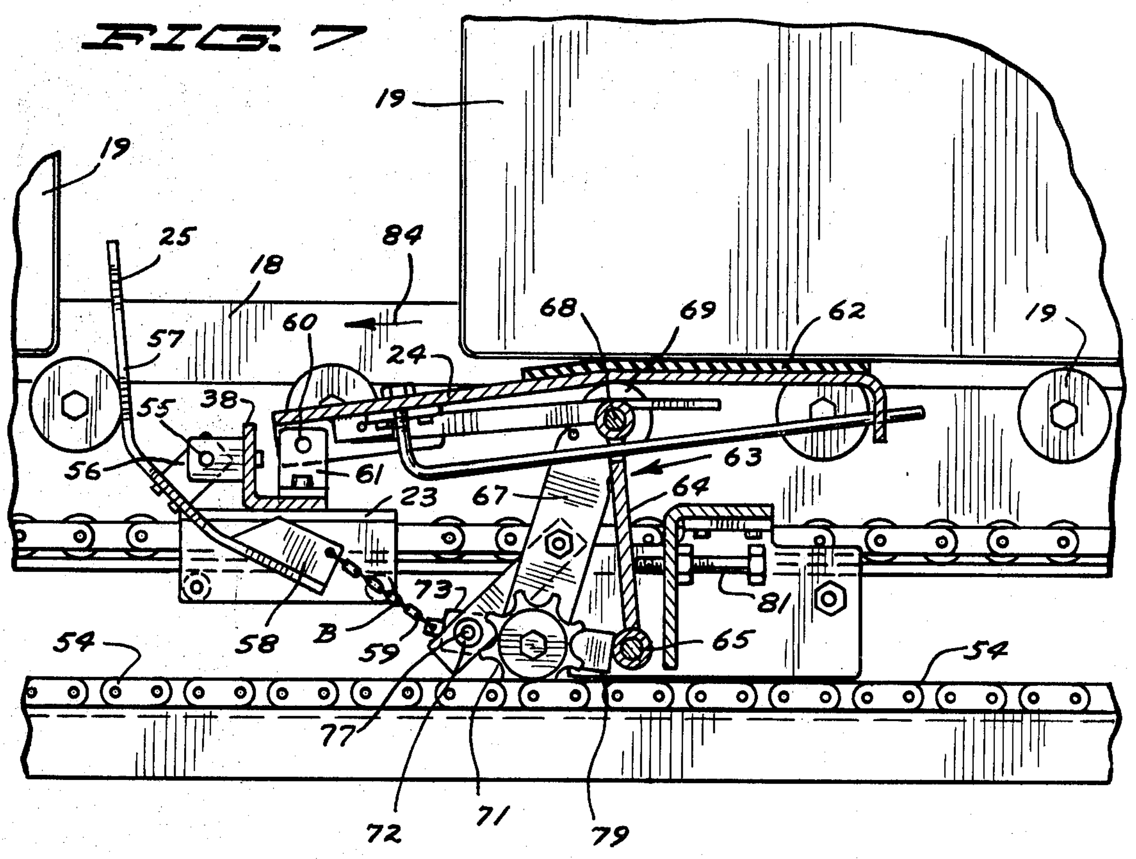
FIG. 7 is a view similar to FIGS. 5 and 6 but showing the relationship of the parts as the feeler arm moves to its forward most position and the platform is caused to move into driving relationship with a box on the conveyor.

As perhaps best seen in FIG. 7, the feeler arm 25 is pivotally mounted as at 55 to a bracket 56 extending forwardly from the angle iron 38. The feeler arm includes an upwardly extending feeler portion 57 and a lower extending control portion 58 to which is fastened a chain 59 for the purpose to be described.

The platform 24 is pivotally mounted as at 60 to the leading dolly 35 through the instrumentality of ears 61, 61 on that dolly, as perhaps best seen in FIGS. 3 and 7. In its operation, this platform can move between an elevated position as seen in FIG. 7 and a lowered position as seen in FIGS. 5 and 6. As shown, a resilient material 62 having a high coefficient of friction is cemented to the upper surface of the platform to become a part of the platform so that the action of the platform on a box 19, when the platform is aligned underneath the box and is in its elevated position, will be such as to cause the box 19 to be moved along the conveyor in the direction of movement of the carriage assembly.

A platform control linkage 63 includes a platform lifting plate 64 pivotally mounted with respect to the following dolly 37 as at 65; and a drive arm 67 pivotally mounted to an upper portion of the platform lifting plate 64 as at 68.

Also mounted to the lifting plate 64 at 68 are a pair of ball bearing wheels 69, 69 designed to ride on the underside of the platform 24 to cause it to be elevated under the action of the drive arm in a manner to be described subsequently.

A sprocket wheel 70 is rotatably mounted about a fixed pivot point at a lower end of the drive arm 67 and is of a size to run properly in the roller chain 54. A locking arm 71 is pivotally mounted on an intermediate portion of drive arm 67 and has a locking bar 72 fixedly mounted in an outer end thereof, said locking arm being movable between a position in which said locking bar is in rotation preventing relationship to sprocket wheel 70 and position where said locking bar 72 is in clearing relationship to said sprocket wheel. A limit arm 73 is pivotally mounted with respect to said locking arm on the same axis as locking bar 72 is situated. This limit arm is provided with a lost motion slot 74 which encompasses a shaft 75 about which sprocket wheel 70 rotates with respect to the drive arm 67. The end of the chain 59 opposite to that connected to the feeler arm is connected to the pivot point 77 between the locking arm 71 and the limit arm 73. A rearwardly extending stop portion 79 of the limit arm 73 is situated to come into contacting relationship to the lower pivot 65 of lifting plate 64 as the platform reaches its elevated position. These foregoing relationships can best be seen in FIGS. 4, 5, 6 and 7.

OPERATION

Figure 1:
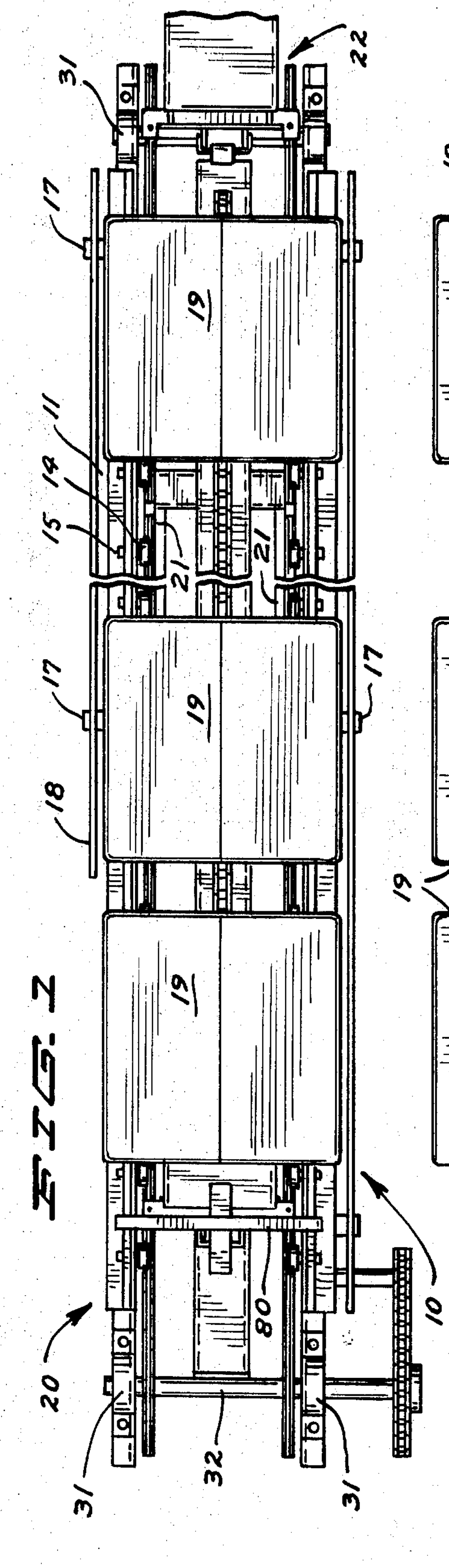
FIG. 1 is a top plan view of an accumulation conveyor made according to the present invention showing two boxes stored thereon at the farthest end thereof and showing a third box in position to be moved into spaced stored relationship with respect to the other two boxes.

In order to utilize the accumulation conveyor 10, boxes 19 or other pallets or containers of various lengths, weights or shapes will be placed thereon from the right as seen in FIGS. 1 and 2. A typical installation would include provision for the boxes to slide into place from a conveyor located above and to the right, but the boxes could be put in place by means of a fork lift truck, overhead hoist, or using any preferred means. No such apparatus is shown in the drawings.

As seen in FIGS. 1 and 2, two packages or boxes 19 have already reached their final stored position and are spaced from each other and from an end bar 80 by a distance determined by the relationship of the feeler bar 25 with respect to the platform carrier 23, as will be explained.

Any number of carriage assemblies 22 can be mounted on the carriage assembly drive chain 27, depending on the length of the conveyor and the need for speed in bringing the conveyed boxes into final spaced relationship with each other. Each carriage assembly can be effective only to move every box on the conveyor up to spaced relationship with the box ahead of it on each pass of the conveyor assembly along the line. Thus as the farthest most one of 10 boxes is removed, and even if no other boxes are added to the conveyor, it will take nine passages by one carriage assembly or others to respace all of the remaining nine boxes properly on the conveyor.

Figure 4:
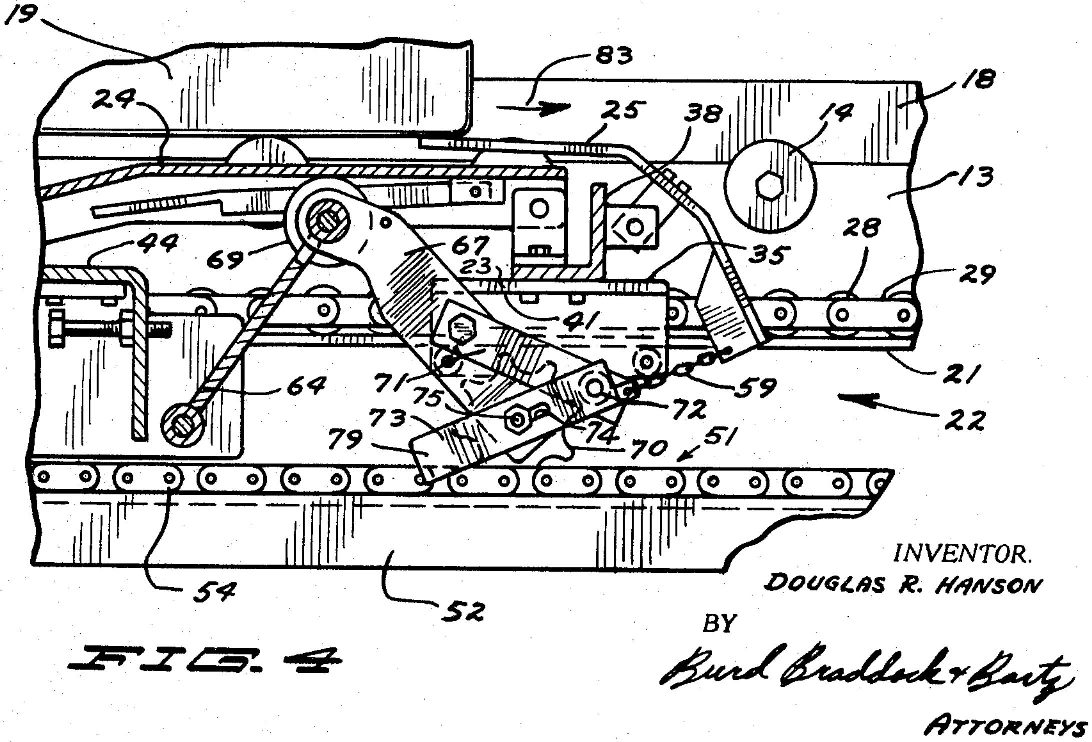
FIG. 4 is an enlarged vertical sectional view taken on the line 4—4 in FIG. 3.

The carriage assemblies 22 are shown at various locations on FIGS. 1 and 2, and the same relationship is not shown on each of these two FIGS. For example, the carriage assembly shown on the carriage track 21 in about the middle of FIG. 2 has its parts positioned substantially as shown in FIGS. 4 and 5, while the carriage assembly shown at the right in FIG. 2 and the carriage assembly shown at the right in FIG. 1 has parts positioned more nearly as seen in FIG. 7, except that the carriage is shown progressing with the chain 27 around the sprockets 30.

To consider the movement of the right-hand box 19 from position as seen in FIGS. 1 and 2, for example, to a position spaced from the center most box in FIG. 1, consideration first will be had of the carriage assembly as seen in FIGS. 4 and 5, next as seen in FIG. 6 and finally as seen in FIG. 7.

As seen in FIGS. 4 and 5 the platform 24 is in its lowered position in spaced relationship to the box 19, and the feeler arm 25, moving with the carriage assembly 22, in the direction of the arrow 84, is still under the leading edge of the box. Chain 59, pulled by control portion 58 of feeler arm 25, has carried the limit arm 73 to its most forward position so that the axle of sprocket wheel 70 is held in the lost motion slot 74 so that the sprocket wheel 70 turns freely on the fixed roller chain 54 of the power reaction pathway 51. This forward positioning of the limit arm 73 also serves to position the locking arm 71 and the locking bar 72 in spaced relationship to the sprocket 70. With this positioning of parts, the platform-lifting plate 64 and its wheels 69, 69 are so positioned that the wheels are not exerting any upward force on the undersurface of the platform 24.

When first the feeler portion 57 of the feeler arm 25 comes into clearing relation with the box 19, as seen in FIG. 6, the feeler bar will take position as seen in that FIG. under the action of gravity, thus loosening chain 59 and allowing locking bar 72 to slide (under the guidance of slotted limit arm 73, and around the opposite pivoted end of locking arm 71) into the space between two sprocket teeth on the sprocket 70, thus locking the sprocket 70 temporarily against rotation about the drive arm 67. Since the motion of the carriage assembly 22 will continue to move the carriage in the direction of the arrow 84, and since the sprocket 70 cannot turn because of the locking bar 72, the action will be to cause the sprocket end of the drive arm 67 and the lower pivoted end of the platform-lifting plate 64 to move toward each other, thus forcing the top ends of these elements, and consequently the wheel 69, 69 in upward direction. The wheels thus force the platform 24 upwardly bringing the platform into driving relationship to the under side of the box 19.

As best seen in FIG. 7, the rearwardly extending stop portion 79 of the limit arm 73 moves in direction toward the pivot point 65 of the platform-lifting plate 64, and then portion 79 contacts the lower portion of the lifting plate, so that further motion of the sprocket relative to the bottom pivot of the lifting plate will cause the limit arm 73 to move forward relatively to the sprocket thus driving the locking bar 72 into clearing relationship to the teeth of the sprocket 70, and allowing the sprocket to once more turn freely along the fixed chain 54. At this point, the chain 59 has been pulled tight between the limit arm 73 and the control portion 58 of the feeler arm as seen in FIG. 7. Also, the box 19 has been lifted from the rollers 14, or at least sufficient weight has been picked up from those rollers, so that the box will move with the platform 24 in the direction of the arrow 84.

In order to make the apparatus particularly sensitive to release of the load, in the manner to be described, a stop bolt 81 is provided in the angle iron 44 to prevent the platform-lifting plate 64 from passing into an over center position with respect to the pivot point 68 and the pivot point 65.

When the feeler portion 57 of the feeler arm 25 comes into contact with a box ahead of it, as is about to happen in FIG. 7, the control portion 58 of that feeler arm will, through the instrumentality of the chain 59, pull the limit arm 73, and consequently the sprocket 70, forward toward position as seen in FIG. 5, thus again lowering the wheels 69, 69 and causing the platform to be lowered to position as seen in that FIG. As soon as this happens, the drive on the box 19 will have ceased, and the box will maintain its position on the conveyor in spaced relationship to the box ahead of it.

As long as the feeler arm 25 is held down as it passes underneath subsequent boxes, the platform will be maintained in its lowered condition. When the feeler arm comes up between two boxes already spaced at the proper distance from each other, as seen in FIG. 5 the locking bar 72 will tend to move into space between the teeth on the sprocket 70, but as soon as this position is obtained, the feeler arm will again be knocked down by the forward box, immediately pulling the locking bar from between the sprocket teeth before the wheels 69, 69 can move to affect the raising of the platform. This action will take place between each of the boxes on the conveyor as long as the spacing between the boxes is the correct predetermined spacing.

As seen in FIG. 1, the confining sidewall 18 in adjacent relationship to one side of the conveyor has been omitted at position adjacent the box situated next to the outer end 20 of the conveyor. This is for the purpose of allowing the boxes to be removed from the conveyor as they are needed. This could be done by fork lift truck or by skidding onto another platform or conveyor (not shown) or by any other usual or preferred method. When this happens, the next carriage assembly 22 passing under the box shown in the center of FIG. 1 would cause that box to be lifted and conveyed to position as presently held by the box now illustrated to the left in FIG. 1, the bar 80 being the device which would cause the feeler arm to be depressed to lower the platform 24 to so position the box.

As pointed out earlier, the flexible relationship between the leading dolly 35 and the following dolly 37 is such that the carriage assembly can pass freely around the sprockets 30 with the flexible chain 27.

An L-shaped rod 82 is fixedly mounted with respect to the surface of the platform 24, extends around the pivot point 68 of the platform lifting plate 64 and the drive arm 67, and is mounted in an opening in the platform 24 for the purpose of preventing the platform from falling too far away from the rest of the carriage assembly as the assembly is moving underneath of the conveyor as best seen at 83 in FIG. 2.

In order to adjust the spacing between the articles on the conveyor, it is necessary only to change the length of the bracket 56 to which the feeler arm 25 is pivoted as at 55, and to change the length of the chain 59. While the bracket 56 is shown as having only one pivotal hole extending therethrough, It is to be understood that the bracket could be elongated and a number of holes representative of different predetermined spacings could be provided, to the end that the adjustment of space between the boxes could be accomplished merely by changing the pivot pin at 55 in its location and by removing or adding links of chain 59.

I claim:

1. An accumulation conveyor for receiving boxes or other like articles and for maintaining them in predetermined spaced relation from each other until they are removed therefrom; said conveyor including a linear conveyor track having means to support said boxes on a conveyor track support plane; at least one platform carriage; a carriage track for supporting said platform carriage for movement parallel to said linear conveyor track; means for driving said platform carriage along said carriage track parallel to direction of box movement; a fixed pathway parallel to said carriage track; a platform mounted on said carriage for movement between an elevated and a lowered position; a platform control linkage connected between said platform and said carriage and including a drive arm operative upon movement of said carriage with respect to said fixed pathway to cause said platform to be elevated into driving relationship to a first box on said conveyor track as said drive arm is moved into driving relationship to said pathway, and to cause said platform to be lowered from driving relationship to said first box as said drive arm is moved out of driving relationship to said pathway; and a feeler arm supported with respect to said platform carriage to normally extend ahead of said first box and in the path of said box above said conveyor track support plane, said feeler arm being operatively associated with said control linkage to cause said drive arm to move into and out of driving relationship to said pathway responsive, respectively, to the absence and presence of another box at said predetermined distance ahead of said first box.

2. An accumulation conveyor for receiving boxes or other like articles and for maintaining them in a predetermined spaced relation from each other until they are removed therefrom; said conveyor including a linear conveyor track having means to support said boxes on a conveyor track support plane and to confine said boxes against substantial lateral movement; an endless flexible drive chain having a first upper portion thereof situated parallel to and below said track support plane; means for driving said chain to cause said first portion to move in direction parallel to the direction of box movement; at least one platform carriage driven by said chain and supported below and parallel to said track support plane during its movement with said chain along said first upper portion thereof; a fixed pathway parallel to said first upper track portion and below said carriage; a platform mounted on said carriage for movement between an elevated and a lowered position; a platform control linkage connected between said platform and said carriage and including a drive arm operative upon movement of said carriage with respect to said fixed pathway to cause said platform to be elevated into driving relationship to a first box on said conveyor track as said drive arm is moved into driving relationship to said pathway, and to cause said platform to be lowered from driving relationship to said first box as said drive arm is moved out of driving relationship to said pathway; and a feeler arm supported with respect to said platform carriage to normally extend ahead of said box and above said conveyor track support plane and moveable responsive to the presence of another box ahead of said first box to position below said conveyor support plane, said feeler arm being operatively associated with said control linkage to cause said drive arm to move into and out of driving relationship to said pathway responsive, respectively to the absence and presence of another box at said predetermined distance ahead of said first box.

3. The combination as specified in claim 2 wherein said fixed pathway includes a fixedly mounted length of drive chain; and said control linkage includes a sprocket clutch rotatably mounted on an outer end of said drive arm to normally roll along said drive chain as said carriage moves in direction of box movement, and means including a locking bar connected to move into rotation preventing relationship to said sprocket to clutch said drive arm to said drive chain as said feeler arm moves from position below said conveyor support plane into its normal position and to position said locking bar out of rotation preventing relationship to said sprocket after said drive arm has moved said platform to its elevated position.